(12) United States Patent
Cook

(10) Patent No.: US 6,382,888 B2
(45) Date of Patent: May 7, 2002

(54) VIBRATION DAMPENED SPINDLE AND TOOL HOLDER ASSEMBLY

(76) Inventor: Harold D Cook, 33642 Via Martos, Dana Point, CA (US) 92629

( * ) Notice: Subject to any disclaimer, the term of this patent is extended or adjusted under 35 U.S.C. 154(b) by 0 days.

(21) Appl. No.: 09/934,964

(22) Filed: Aug. 22, 2001

Related U.S. Application Data

(63) Continuation-in-part of application No. 09/512,936, filed on Feb. 25, 2000, which is a division of application No. 09/128,067, filed on Aug. 3, 1998, now Pat. No. 6,071,219, which is a continuation-in-part of application No. 08/890,221, filed on Jul. 9, 1997, now Pat. No. 5,975,816.

(51) Int. Cl.$^7$ .............................. B23C 9/00; B23B 31/00
(52) U.S. Cl. ........................ 409/141; 29/447; 279/103; 279/158; 408/143; 409/232; 409/234
(58) Field of Search ...................... 483/13, 1; 409/131, 409/141, 234, 231, 232, 233; 408/143; 239 A, 239 R, 238; 279/158, 103, 102; 29/447, DIG. 46; 82/158, 152

(56) References Cited

U.S. PATENT DOCUMENTS

| | | |
|---|---|---|
| 5,322,304 A | 6/1904 | Rivin |
| 1,285,589 A | 11/1918 | Barnes |
| 1,404,016 A | 1/1922 | Engelbrekt |
| 1,409,753 A | 3/1922 | Moore |
| 1,539,413 A | 5/1925 | Fish |
| 1,658,504 A | 2/1928 | Weiss |
| 1,936,498 A | 11/1933 | Corbett |
| 1,994,792 A | 3/1935 | Sanderson |
| 2,125,005 A | 9/1938 | Jearum |
| 2,161,062 A | 6/1939 | Killgore |
| 2,374,919 A | 5/1945 | Bruseth |
| 2,729,458 A | 1/1956 | Sacrey |
| 2,860,547 A | 11/1958 | Stephan |
| 2,893,291 A | 7/1959 | Hollis |
| 2,913,935 A | 11/1959 | Flannerty et al. |

(List continued on next page.)

FOREIGN PATENT DOCUMENTS

| | | |
|---|---|---|
| DE | 662704 | 6/1938 |
| DE | 2229374 | 1/1974 |
| DE | 2759007 | 8/1978 |
| DE | 2811977 | 9/1979 |
| EP | 0026751 | 11/1981 |
| EP | 340369 | 11/1989 |
| GB | 551065 | 2/1942 |
| GB | 729295 | 5/1955 |
| GB | 921522 | 3/1963 |
| GB | 1319200 | 6/1973 |
| GB | 2137124 A | 10/1984 |
| JP | 5316976 | 8/1978 |
| JP | 57107710 | 5/1982 |

OTHER PUBLICATIONS

Coolant Adapters (Flush Cut) by X–L Tool Company; 1 page*.
MI–Tech Metals, Inc., "High Density Tungsten Based Metals" 4 pages*.
Introducting Kennametal "Tuned Tooling" 7 pages*.

Primary Examiner—William Briggs
(74) Attorney, Agent, or Firm—Stetina Brunda Garred & Brucker

(57) ABSTRACT

A vibration dampened spindle and tool holder assembly for a rotary cutting machine. The assembly includes a spindle and a tool holder retained therewith. The tool holder has an interfacing ledge with a top surface for abutment with a distal spindle surface, and a continuous channel disposed in a proximal portion of the top surface. A resilient dampening member, having a rectangular or a circular cross sectional configuration, resides in the channel for compressed abutment with the spindle surface. Because the dampening member is situated within the channel, the interfacing placement of the spindle surface and tool holder top surface meet as the dampening member is enshrouded in the channel by these abutting surfaces and thereby protected from contaminant entry during dampening action.

10 Claims, 2 Drawing Sheets

U.S. PATENT DOCUMENTS

| | | | | |
|---|---|---|---|---|
| 2,918,290 | A | 12/1959 | Werstein | |
| 2,920,913 | A | 1/1960 | Antila | |
| 2,942,891 | A | 6/1960 | Zale | |
| 3,053,118 | A | 9/1962 | Lavallee | |
| 3,221,404 | A | 12/1965 | Averill et al. | |
| 3,307,243 | A | 3/1967 | Andreasson | |
| 3,372,951 | A | 3/1968 | McCash | |
| 3,397,615 | A | 9/1968 | Meinke | |
| 3,424,055 | A | 1/1969 | Rollat | |
| 3,463,048 | A | 8/1969 | Owsen | |
| 3,557,419 | A | 1/1971 | Flannery | |
| 3,734,515 | A | 5/1973 | Dudek | |
| 3,807,804 | A | 4/1974 | Kniff | |
| 3,937,587 | A | 2/1976 | Lindem | |
| 3,945,752 | A | 3/1976 | Bennett | |
| 3,989,260 | A | 11/1976 | Zonkov et al. | |
| 3,994,615 | A | 11/1976 | Narang | |
| 4,021,051 | A | 5/1977 | Toyomoto et al. | |
| 4,099,889 | A | 7/1978 | Vig | |
| 4,133,545 | A | 1/1979 | Komori | |
| 4,226,562 | A | 10/1980 | Schmid et al. | |
| 4,251,113 | A | 2/1981 | Mitin et al. | |
| 4,274,774 | A | 6/1981 | Haga et al. | |
| 4,447,181 | A | * 5/1984 | Asano | 29/DIG. 46 |
| 4,453,775 | A | 6/1984 | Clemmow | |
| 4,551,947 | A | * 11/1985 | Grimm et al. | 408/141 X |
| 4,619,564 | A | 10/1986 | Jacobson | |
| 4,668,138 | A | 5/1987 | Carter | |
| 4,714,389 | A | * 12/1987 | Johne | 409/233 |
| 4,748,879 | A | * 6/1988 | Von Haas | 409/234 X |
| 4,795,292 | A | 1/1989 | Dye | |
| 4,808,049 | A | 2/1989 | Cook | |
| 4,818,161 | A | 4/1989 | Cook | |
| 4,934,743 | A | 6/1990 | Kapgan et al. | |
| 4,971,491 | A | 11/1990 | Cook | |
| 5,033,340 | A | * 7/1991 | Siefring | 82/158 |
| 5,048,375 | A | 9/1991 | Kobayashi | |
| 5,140,739 | A | 8/1992 | Yamaguchi et al. | |
| 5,277,435 | A | 1/1994 | Kramer | |
| 5,280,671 | A | 1/1994 | Marquart | |
| 5,311,654 | A | 5/1994 | Cook | |
| 5,352,073 | A | * 10/1994 | Kitaguchi | 409/232 |
| 5,388,487 | A | * 2/1995 | Danielsen | 82/152 |
| 5,595,391 | A | 1/1997 | Rivin | |
| 5,975,816 | A | * 11/1999 | Cook | 29/447 X |
| 6,071,219 | A | * 6/2000 | Cook | 279/103 X |

* cited by examiner

VIBRATION DAMPENED SPINDLE AND TOOL HOLDER ASSEMBLY

CROSS REFERENCE TO RELATED APPLICATIONS

This application is a continuation-in-part of U.S. patent application Ser. No. 09/512,936, filed Feb. 25, 2000, which is a divisional of U.S. patent application Ser. No. 09/128,067, filed Aug. 3, 1998, now U.S. Pat. No. 6,071,219, which is a continuation-in-part of U.S. patent application Ser. No. 08/890,221, filed Jul. 9, 1997, now U.S. Pat. No. 5,975,816.

STATEMENT RE: FEDERALLY SPONSORED RESEARCH/DEVELOPMENT

Not Applicable

BACKGROUND OF THE INVENTION

The present invention relates in general to rotary cutting machines such as drill presses, milling machines, and the like, and in particular to a vibration-dampened spindle and tool holder assembly employing a resilient dampening member in compressed interfacing contact between the spindle and tool holder and encapsulated from the environment to thereby maintain generally non-contaminated and non-adulterated dampening properties.

A rotary cutting machine typically includes a motor-rotated spindle to which a tool holder is proximally attached and from whose distal end a held cutting tool projects for cutting contact with a workpiece. Attachment of the tool holder to the spindle generally is accomplished by providing a cavity in the spindle into which the proximal end of the tool holder is secured as with a centrally disposed threaded bolt. While slower rotational speeds generally permit the cutting machine to perform adequately, high speed cutting, which is, of course, preferred, can cause substantial difficulty in producing a satisfactory work product. In particular, at least two major factors can preclude satisfactory operations. The first of these factors concerns the development of vibratory forces that occur between the spindle and the tool holder. Specifically, at higher rotational cutting speed, the cutting tool begins to chatter or vibrate such that adequate tool control cannot be maintained and damage to the workpiece, along with potential injury to the operator should runaway control occur, can realistically occur. The second such major factor that can contribute toward unsatisfactory operations occurs as the cutting tool is used and dirt, metal shavings, and other contaminants of the environment reach interface sites of the spindle and tool holder to cause interference with concentric alignment of cutting heads in relation to cutting sites because of imbalances caused by particulate becoming lodged in a non-concentric manner.

In view of these difficulties, it is therefore apparent that needs are present to, first, stabilize high speed operation of rotary cutting tools by dampening vibrations and, second, maintain tool cleanliness at critical sites thereof such that concentricity as well as stability are preserved. Accordingly, a primary object of the present invention is to provide a vibration-dampened spindle and tool holder assembly for a rotary cutting machine whereby vibration dampening material is strategically placed to promote vibration-free operability.

Another object of the present invention is to provide an accommodation site for dampening material where the dampening material is protected from contamination generated in the work environment.

These and other objects of the present invention will become apparent throughout the description thereof which now follows.

BRIEF SUMMARY OF THE INVENTION

The present invention is a vibration dampened tool-holder mount and holder assembly for a rotary cutting machine. The assembly includes a tool-holder mount, such as exemplified by a spindle, for retaining a tool holder, and is provided with an axial recess with a distal entrance. Also included as a component of the assembly is a tool holder having a proximal end for retention within the recess of the tool-holder mount and an interfacing ledge immediately distal from this proximal end. The ledge has a top surface with a distal parameter portion for abutment with a tool-holder mount surface surrounding the entrance to the recess thereof, and a continuous channel disposed in a proximal portion of the top surface. A resilient dampening member is disposed in the channel and sized to at least fill the channel to provide an exposed top for compressed abutment with the tool-holder mount surface. This dampening member preferably is fabricated from a natural or synthetic rubber composition, and is formed to have either a rectangular or a circular cross sectional configuration. Because the dampening member is situated within the channel as defined above, the interfacing connection of the tool-holder mount and the tool holder permits the outer parameters of the mount surface itself and tool holder itself to meet while the dampening member is enshrouded by these meeting parameters and thereby protected from contaminant entry during compression-relaxation activity during its dampening action. Additionally, such dampening-member placement aids in ensuring a simultaneous concentrical fit of the mount and the tool holder to thereby produce a predictable and focused precise-rotation presence for workpiece production.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
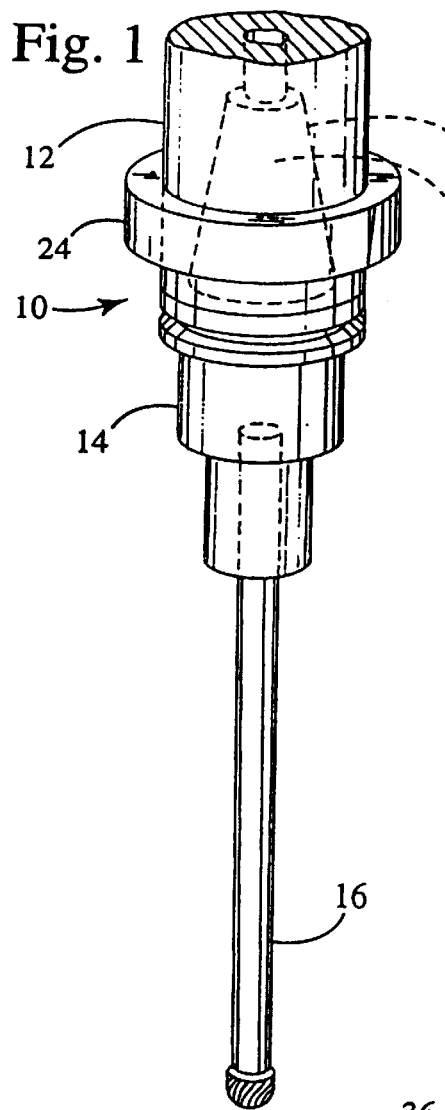
FIG. 1 is a perspective view of a spindle and tool holder assembly for a rotary cutting machine with a tool secured to the tool holder.
Figure 2:
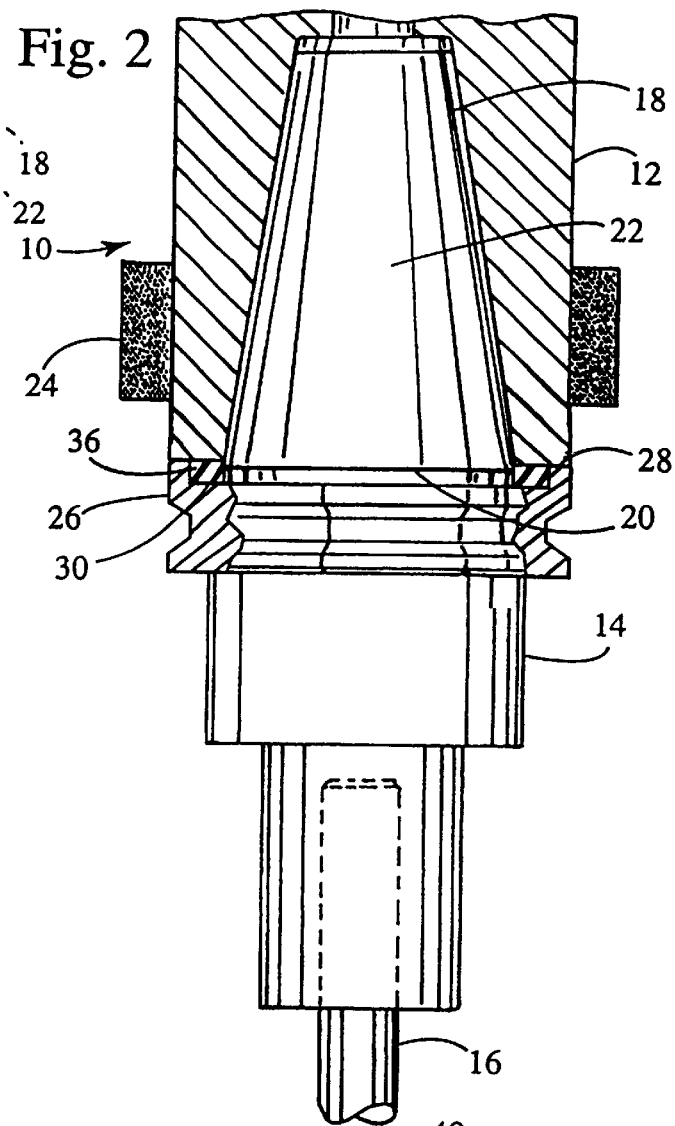
FIG. 2 is a side elevation view partially in section of the spindle and tool holder secured therewith as in FIG. 1.
Figure 5:
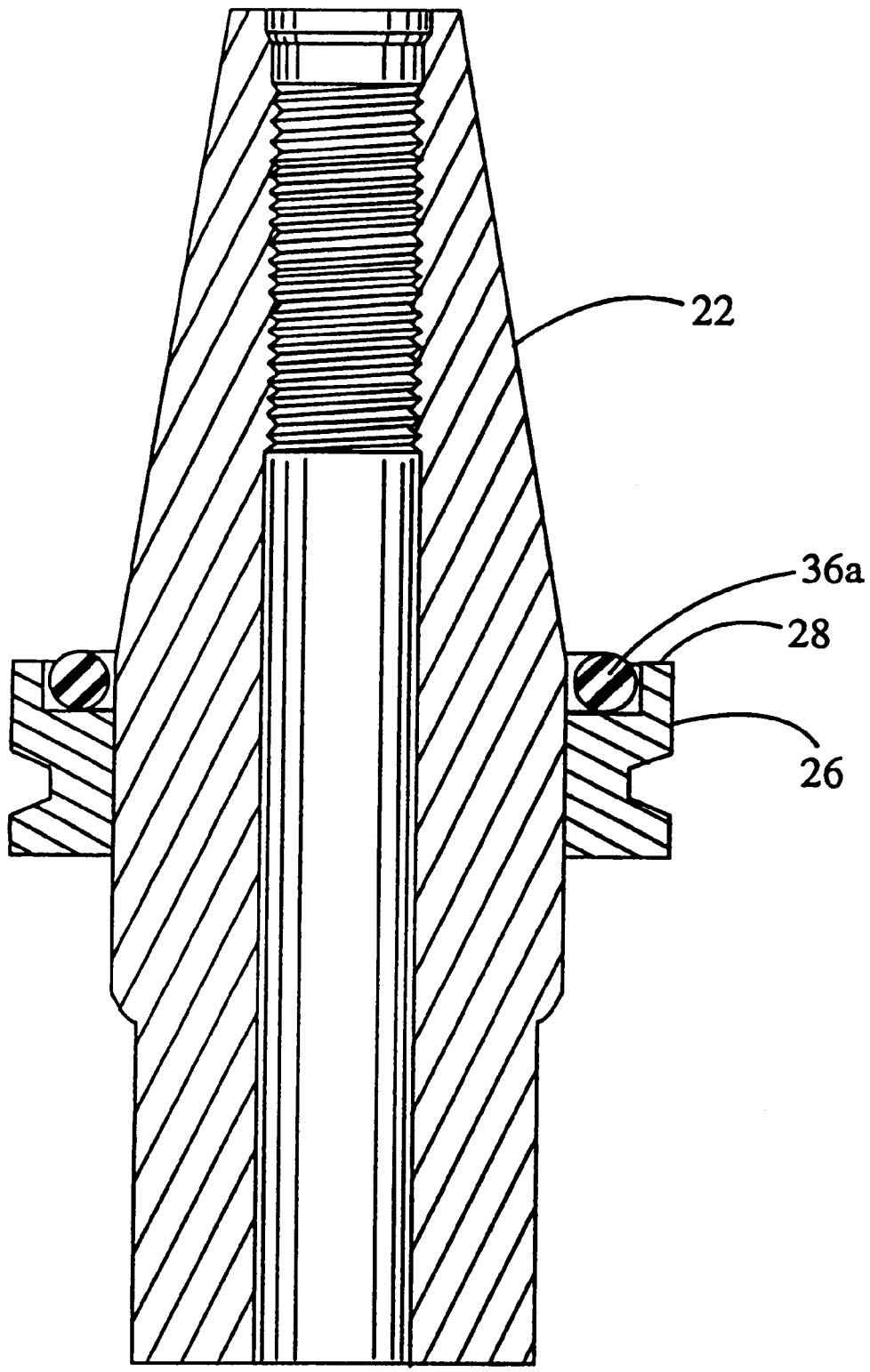
FIG. 5 is a side elevation view in section of the proximal end of the tool holder of FIG. 1.

Referring to FIGS. 1, 2, and 5, a vibration-dampened spindle and tool holder assembly 10 for a rotary cutting machine (not shown) is illustrated and includes a spindle 12 and a tool holder 14. The spindle 12 is in communication with a rotary motor of the cutting machine to thereby rotate and effectuate cutting by a cutting tool 16. The spindle 12 is provided with a concentrically disposed axial recess 18 with an axial distal entrance 20 into which the proximal end 22 of the tool holder 14 passes for retainment. An annular compression ring functions to tightly retain the proximal end 22 of the tool holder 14 with the spindle 12. Because of the heat that can be generated during a cutting procedure, it is preferred that the ring 24 not be readily heat expandable and thus become less functional in retaining the proximal end 22 of the tool holder 14. Consequently, it is preferred that the ring 24 be fabricated of a carbon fiber as known in the art or a similar material that is not prone to expansion upon heating. Placement of such ring 24 on the spindle 12 is accomplished by cooling the spindle 12 to cause shrinkage thereof and immediately slipping the ring 24 into place on the spindle 12. Thereafter, as the spindle 12 heats to ambient temperature and continues to heat during tool use, the resulting expansion of spindle diameter continues to cause and increase very tight engagement of the ring 24 and spindle 12 for ultimate pressured securement of the proximal end 22 of the tool holder 14. The tool holder 14 has a ledge 26 immediately distal its proximal end 22, with the ledge 26 having a top surface 28 including a continuous annular channel 30 disposed therein. The channel 30 is disposed in a proximal radial portion 32 of the top surface 28, while a distal radial portion 34 of the top surface 28 is flat.

Figure 3:
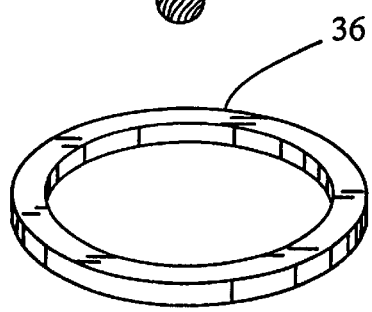
FIG. 3 is a perspective view of a dampening-material structure with a rectangular cross section configuration.
Figure 4:
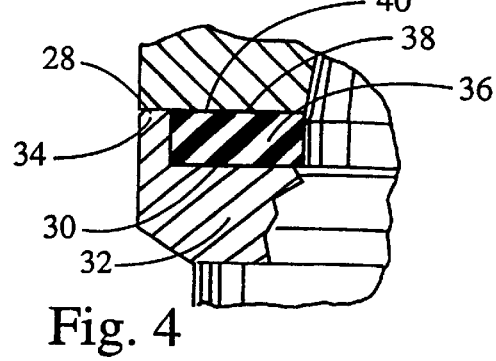
FIG. 4 is an enlarged cross section view of dampening material in interface relationship with portions of the spindle and the tool holder of FIG. 1.

Disposed within the annular channel 30, and sized to at least fill the channel 30, is a dampening member 36 with an exposed top 38 and preferably fabricated of a natural or synthetic rubber composition, most preferably a butyl rubber composition, as would be recognized in the art. The dampening member 36, shown in its entirety in FIG. 3 and in cross section in FIGS. 2 and 4, has a generally rectangular cross-section configuration, while a second embodiment of a dampening member 36a, shown in FIG. 5, has a generally circular cross-section configuration. Securement of the spindle 12 and tool holder 14, as illustrated in FIGS. 2 and 4, results in interface abutment of the distal portion 34 of the top surface 28 of the tool holder 14 with a spindle surface 40 that surrounds the entrance 20 into the recess 18. The exposed top 38 of the dampening member 36 is in compressed abutment with the spindle surface 40, thereby causing the entire dampening member 36 to be compressed within the annular channel 30. In substantially the same manner, the dampening member 36a, shown in the embodiment of FIG. 5, also compresses for such compressed abutment with the spindle surface 40.

In operation, the assembly 10 is rotated at high speed to thereby facilitate cutting action as the cutting tip 42 of the cutting tool 16 is positioned against a workpiece (not shown) This action automatically causes vibratory stress to occur at the interface of the spindle 12 and tool holder 14, and such stress normally would cause vibration, chatter, and an unsatisfactory work product. These untoward events do not occur, however, in the present assembly 10 as the dampening member 36 or 36a continuously compresses and relaxes in response to such vibratory stress and thereby yields a smoothly operational work result. Simultaneously, because the dampening member 36, 36a is enshrouded in the channel 30 by the interfacing distal radial portion 34 of the top surface 28 and the spindle surface 40, the dampening member 36, 36a is effectively protected from workplace environmental contaminants, thereby assuring longevity of generally trouble-free vibration protection.

While an illustrative and presently preferred embodiment of the invention has been described in detail herein, it is to be understood that the inventive concepts may be otherwise variously embodied and employed and that the appended claims are intended to be construed to include such variations except insofar as limited by prior art.

What is claimed is:

1. A vibration-dampened spindle and tool holder assembly for a rotary cutting machine, the assembly comprising:
   a) a spindle for retaining a tool holder, the spindle including a concentrically disposed axial recess with an axial distal entrance thereto;
   b) a tool holder having a proximal end for retention within the axial recess of the spindle and an interfacing ledge immediately distal said proximal end, said ledge having a top surface with a distal radial portion for abutment with a spindle surface surrounding the entrance to the axial recess;
   c) an annular continuous channel disposed in a proximal radial portion of the top surface of the interfacing ledge; and
   d) an annular resilient dampening member disposed in the annular channel and sized to at least fill said channel, said dampening member having an exposed top for compressed abutment with said spindle surface.

2. The assembly as claimed in claim 1 wherein the dampening member is fabricated from a natural or synthetic rubber composition.

3. The assembly as claimed in claim 2 wherein the rubber composition is a butyl rubber composition.

4. The assembly as claimed in claim 1 wherein the dampening member has a generally rectangular cross section.

5. The assembly as claimed in claim 1 wherein the dampening member has a generally circular cross section.

6. A vibration-dampened tool-holder mount and holder assembly for a rotary cutting machine, the assembly comprising:
   a) a tool-holder mount for retaining a tool holder, the tool-holder mount including an axial recess with a distal entrance thereto;
   b) a tool holder having a proximal end for retention within the recess of the tool-holder mount and an interfacing ledge immediately distal said proximal end, said ledge having a top surface with a distal parameter portion for abutment with a tool-holder mount surface surrounding the entrance to the recess;
   c) a continuous channel disposed in a proximal portion of the top surface of the interfacing ledge; and
   d) a resilient dampening member disposed in the channel and sized to at least fill said channel, said dampening member having an exposed top for compressed abutment with said tool-holder mount surface.

7. The assembly as claimed in claim 6 wherein the dampening member is fabricated from a synthetic or natural rubber composition.

8. The assembly as claimed in claim 7 wherein the rubber composition is a butyl rubber composition.

9. The assembly as claimed in claim 6 wherein the dampening member has a generally rectangular cross section.

10. The assembly as claimed in claim 6 wherein the dampening member has a generally circular cross section.

* * * * *